(12) United States Patent
Yang et al.

(10) Patent No.: US 11,924,762 B2
(45) Date of Patent: Mar. 5, 2024

(54) INFORMATION SENDING METHOD, INFORMATION RECEIVING METHOD, NETWORK DEVICE AND TERMINAL

(71) Applicant: DATANG MOBILE COMMUNICATIONS EQUIPMENT CO., LTD., Beijing (CN)

(72) Inventors: Meiying Yang, Beijing (CN); Deshan Miao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 480 days.

(21) Appl. No.: 17/268,572

(22) PCT Filed: Aug. 16, 2019

(86) PCT No.: PCT/CN2019/101083
§ 371 (c)(1),
(2) Date: Feb. 15, 2021

(87) PCT Pub. No.: WO2020/035059
PCT Pub. Date: Feb. 20, 2020

(65) Prior Publication Data
US 2021/0195529 A1 Jun. 24, 2021

(30) Foreign Application Priority Data
Aug. 17, 2018 (CN) .......................... 201810942898.2

(51) Int. Cl.
*H04W 52/02* (2009.01)
*H04L 5/00* (2006.01)
(Continued)

(52) U.S. Cl.
CPC ....... *H04W 52/0235* (2013.01); *H04L 5/0051* (2013.01); *H04W 72/0453* (2013.01);
(Continued)

(58) Field of Classification Search
CPC . H04W 52/0235; H04W 76/27; H04W 72/23; H04W 72/0453; H04W 80/02; H04L 5/0051
See application file for complete search history.

(56) References Cited

U.S. PATENT DOCUMENTS

2015/0351034 A1    12/2015  Lin et al.
2018/0097598 A1*  4/2018  Ang ................. H04W 52/0245
(Continued)

FOREIGN PATENT DOCUMENTS

CN      108024310 A    5/2018
WO    2014121512 A1    8/2014
(Continued)

OTHER PUBLICATIONS

Second Office Action and Search Report from CN app. No. 201810942898.2, dated Oct. 11, 2021, with machine English translation, all pages.
(Continued)

*Primary Examiner* — Gerald Johnson
(74) *Attorney, Agent, or Firm* — Ladas & Parry, LLP

(57) ABSTRACT

An information sending method, an information receiving method, a network device and a terminal are disclosed. The method includes: sending, by the network device, indication information used for indicating transmission information of the power-saving reference signal (PSRS); and sending, by the network device, the PSRS according to the transmission information of the PSRS.

14 Claims, 11 Drawing Sheets

Case 2: P-WUS, P-WUS is only sent when there is a PDCCH to send; if no WUS is detected, the UE does not detect PDCCH

(51) Int. Cl.
*H04W 72/0453* (2023.01)
*H04W 72/23* (2023.01)
*H04W 76/27* (2018.01)
*H04W 80/02* (2009.01)

(52) U.S. Cl.
CPC .......... *H04W 72/23* (2023.01); *H04W 76/27* (2018.02); *H04W 80/02* (2013.01)

(56) References Cited

U.S. PATENT DOCUMENTS

2019/0261255 A1 8/2019 You
2020/0351779 A1* 11/2020 Sharma ................. H04W 76/27

FOREIGN PATENT DOCUMENTS

| WO | 2017189142 A1 | 11/2017 |
| WO | 2018024129 A1 | 2/2018 |
| WO | 2018085571 A1 | 5/2018 |

OTHER PUBLICATIONS

Extended European Search Report from EP app. No. 19850393.0, dated Sep. 13, 2021, all pages.
LG Electronics, "Discussion on NRS on an a non-anchor carrier", R1-1808479, 3GPP TSG RAN WG1 Meeting #94, Gothenburg, Sweden, Aug. 20-24, 2018, all pages.
"On 'wake-up signal' for paging and connected-mode DRX", R1-1707021, 3GPP TSG RAN WG1 Meeting #89, Hangzhou, China, May 15-19, 2017.
"On wake-up signal functionalities", R1-1718062, 3GPP TSG RAN WG1 Meeting #90bis, Prague, CZ, Oct. 9-13, 2017.
"On wake-up signal functionalities", R1-1719997, 3GPP TSG RAN WG1 Meeting 91, Reno, USA, Nov. 27-Dec. 1, 2017.
"DL power consumption reduction for eMTC", R1-1720261, 3GPP TSG RAN WG1 Meeting 91, Reno, USA, Nov. 27-Dec. 1, 2017.
"Wake-up signal configurations and procedures", R1-1804249, 3GPP TSG RAN WG1 Meeting #92bis, Sanya, China, Apr. 16-20, 2018.
"UE Power saving schemes with power saving signal/channel/procedures", R1-1812642, 3GPP TSG RAN WG1 Meeting #95, Spokane, USA, Nov. 12-16, 2018.
"PDCCH-Based Power Saving Signal/Channel Design", R1-1906350, 3GPP TSG RAN WG1 Meeting #97, Reno, USA, May 13-17, 2019.
International Search Report from PCT/CN2019/101083, dated Oct. 30, 2019, with English translation from WIPO.
Written Opinion of the International Searching Authority from PCT/CN2019/101083, dated Oct. 30, 2019, with English translation from WIPO.
International Preliminary Report on Patentability from PCT/CN2019/101083, dated Feb. 23, 2021, with English translation from WIPO.
First Office Action and Search Report from CN app. No. 201810942898.2, dated Feb. 26, 2021, with English translation from Global Dossier.

* cited by examiner

INFORMATION SENDING METHOD, INFORMATION RECEIVING METHOD, NETWORK DEVICE AND TERMINAL

CROSS-REFERENCE TO RELATED APPLICATIONS

The present application is a U.S. national phase application of a PCT Application No. PCT/CN2019/101083 filed on Aug. 16, 2019, which claims a priority to the Chinese patent application No. 201810942898.2 filed in China on Aug. 17, 2018, the disclosures of which are incorporated herein by reference in their entireties.

TECHNICAL FIELD

The present disclosure relates to the technical field of communication, in particular to an information sending method, an information receiving method, a network device and a terminal.

BACKGROUND

With the development of wireless communication systems, terminal types and service types are diversified, and a terminal is required to be capable of saving power, saving network resources and supporting various service types at the same time. In order to ensure the power saving and service reachability of the terminal at the same time, a wakeup signal (WUS) is introduced. The power consumption of the terminal in monitoring the WUS is relatively low. When a wakeup signal for the terminal is received, the terminal is awakened by the wakeup signal, and then starts a communication module (the power consumption thereof is relatively high) to detect a physical downlink control channel (PDCCH), so as to receive paging, receive a physical downlink shared channel (PDSCH), transmit a physical uplink shared channel (PUSCH), perform radio resource management (RRM) measurement, receive a synchronization message or receive a time-frequency tracking signal, so that the purpose of saving power of the terminal is achieved.

After the UE wakes up upon receiving a WUS or after the UE wakes up in a discontinuous reception (DRX)-on duration or after the UE wakes up at a paging reception time, according to a procedure of LTE (Long Term Evolution) or a next generation communication system (New Radio, NR) in the related art, synchronization or time-frequency tracking needs to be performed first, and then radio resource management (RRM) measurement of a local cell and neighboring cells is performed. At this point, it may take significant time to perform synchronization and time-frequency tracking in the related art, mainly because the UE needs to consume considerable power to prepare for receiving the synchronization and time-frequency tracking signals, or because the UE needs to receive the synchronization and time-frequency tracking signals for multiple times in order to meet the synchronization precision requirement, or because the UE needs to receive the synchronization signals for multiple times to perform RRM measurement meeting the measurement precision requirement.

Based on this, a possible enhancement scheme is considered, that is, a power-saving reference signal (PSRS) is introduced. A major characteristic of the PSRS is that, after the UE wakes up, synchronization, time-frequency tracking and RRM measurement may be performed quickly with the PSRS. The PSRS may be aperiodic or in a predefined periodic pattern. Specifically, 1) in a radio resource control idle or inactive (RRC IDLE/RRC Inactive) mode, the PSRS has a transmission manner corresponding to that of SSB, i.e., a quantity of RRM measurement reference signals is the same as a quantity of SSBs, but the RRM measurement reference signals have a denser signal pattern, may be sent in a beam specific manner, may occur in one slot or multiple consecutive slots, wherein one or more symbols in each slot contain the reference signal; the PSRS is sent in bursts and each one is used to at least complete measurement of one RRM sample; 2) in a radio resource control connected mode (RRC Connected), the PSRS has a transmission manner corresponding to that of channel state information reference signal (CSI-RS) used for RRM measurement in the related art, but the PSRS has a denser signal pattern, may be sent in a beam specific manner, may occur in one slot or multiple consecutive slots, wherein one or more symbols in each slot contain the reference signal.

Based on the above analysis, the transmission of the PSRS may have the following problems:

how to transmit and receive the PSRS when the base station configures the PSRS for RRM measurement;

when the base station configures the PSRS for the RRM measurement and configures the WUS, if the WUS does not occur or if the WUS indicates that the UE does not need to perform PDCCH detection and the UE is therefore not awakened, the UE needs to continuously perform the RRM measurement in order to guarantee the RRC connection of the UE, and at the moment, if the UE is not awakened, how does the base station transmit and receive the PSRS in order to guarantee the performance of the RRM measurement.

SUMMARY

Embodiments of the present disclosure provide an information sending method, an information receiving method, a network device and a terminal, which are directed to solve the problem that a base station cannot send a PSRS and the terminal cannot receive the PSRS.

To solve the above technical problem, embodiments of the present disclosure provide the following technical solutions.

An embodiment of the present disclosure provides an information sending method, applied to a network device, including:

sending, by the network device, indication information, wherein the indication information is used for indicating transmission information of a power-saving reference signal (PSRS); and sending, by the network device, the PSRS according to the transmission information of the PSRS.

Optionally, the transmission information of the PSRS includes at least one of a sending position, a sending period and a sending timer of the PSRS.

Optionally, the sending, by the network device, the indication information includes:

sending, by the network device, a wakeup signal (WUS), wherein the WUS is used for indicating the transmission information of the PSRS; or sending, by the network device, static, semi-static or dynamic signaling, wherein the static, semi-static or dynamic signaling is used for indicating the transmission information of the PSRS.

Optionally, the sending, by the network device, the wakeup signal (WUS) includes:

sending, by the network device, at least one WUS periodically or aperiodically.

Optionally, the sending the at least one WUS includes:

sending a first WUS, wherein the first WUS is used for indicating transmission information of a first PSRS.

Optionally, the sending, by the network device, the PSRS according to the transmission information of the PSRS includes:

in a case that a sending position of the first PSRS indicated by the first WUS is reached before the network device sends a second WUS, sending, by the network device, the first PSRS according to indication of the first WUS; or in a case that a sending position of a second WUS is reached before the network device sends the first PSRS, sending, by the network device, the second WUS and updating, by the network device, the transmission information of the first PSRS indicated by the first WUS to obtain transmission information of a second PSRS, and sending, by the network device, the second PSRS according to indication of the second WUS, wherein the second WUS is used for indicating the transmission information of the second PSRS.

Optionally, the sending, by the network device, the static, semi-static or dynamic signaling includes:

sending, by the network device, the static, semi-static or dynamic signaling during sending of first downlink information.

Optionally, the sending, by the network device, the PSRS according to transmission information of the PSRS includes:

in a case that a sending position of a first PSRS indicated by first static, semi-static or dynamic signaling is reached before the network device sends second downlink information, sending the first PSRS according to indication of the first static, semi-static or dynamic signaling; or in a case that a sending position of second downlink information is reached before the network device sends a first PSRS, sending, by the network device, the second downlink information, updating, by the network device, transmission information of the first PSRS indicated by the first static, semi-static or dynamic signaling to obtain transmission information of a second PSRS, sending, by the network device, second static, semi-static or dynamic signaling and sending, by the network device, the second PSRS according to indication of the second static, semi-static or dynamic signaling, wherein the second static, semi-static or dynamic signaling is used for indicating the transmission information of the second PSRS.

Optionally, the static or semi-static signaling includes: radio resource control (RRC) signaling or medium access control control element (MAC CE) signaling; the dynamic signaling includes: downlink control information (DCI) or go-to-sleep (GTS) signaling; the first downlink information and the second downlink information include: downlink data information or downlink control information or downlink system information.

An embodiment of the present disclosure further provides an information receiving method, applied to a terminal, including:

receiving, by the terminal, indication information, wherein the indication information is used for indicating transmission information of a power-saving reference signal (PSRS); and receiving, by the terminal, the PSRS according to the transmission information of the PSRS.

Optionally, the transmission information of the PSRS includes at least one of a receiving position, a receiving period and a receiving timer of the PSRS.

Optionally, the receiving, by the terminal, the indication information includes:

receiving, by the terminal, a wakeup signal (WUS), wherein the WUS is used for indicating the transmission information of the PSRS; or receiving, by the terminal, static, semi-static or dynamic signaling, wherein the static, semi-static or dynamic signaling is used for indicating the transmission information of the PSRS.

Optionally, the receiving, by the terminal, the wakeup signal (WUS) includes:

receiving, by the terminal, at least one WUS periodically or aperiodically.

Optionally, the receiving the at least one WUS includes:

receiving a first WUS, wherein the first WUS is used for indicating transmission information of a first PSRS.

Optionally, the receiving, by the terminal, the PSRS according to the transmission information of the PSRS includes:

in a case that a receiving position of the first PSRS indicated by the first WUS is reached before the terminal receives a second WUS, receiving, by the terminal, the first PSRS according to indication of the first WUS; or in a case that a receiving position of a second WUS is reached before the terminal receives the first PSRS, receiving, by the terminal, the second WUS, and receiving, by the terminal, a second PSRS according to indication of the second WUS, wherein the second WUS is used for indicating transmission information of the second PSRS.

Optionally, the receiving, by the terminal, the static, semi-static or dynamic signaling includes:

receiving, by the terminal, the static, semi-static or dynamic signaling during receiving of first downlink information.

Optionally, the receiving, by the terminal, the PSRS according to transmission information of the PSRS includes:

in a case that a receiving position of a first PSRS indicated by first static, semi-static or dynamic signaling is reached before the terminal receives second downlink information, receiving the first PSRS according to indication of the first static, semi-static or dynamic signaling; or in a case that a receiving position of second downlink information is reached before the terminal receives a first PSRS, receiving, by the terminal, the second downlink information, receiving, by the terminal, second static, semi-static or dynamic signaling, and receiving, by the terminal, a second PSRS according to indication of the second static, semi-static or dynamic signaling, wherein the second static, semi-static or dynamic signaling is used for indicating transmission information of the second PSRS.

Optionally, the static or semi-static signaling includes: radio resource control (RRC) signaling or medium access control control element (MAC CE) signaling; the dynamic signaling includes: downlink control information (DCI) or go-to-sleep (GTS) signaling; the first downlink information and the second downlink information include: downlink data information or downlink control information or downlink system information.

An embodiment of the present disclosure further provides a network device, including:

a transceiver, configured to: send indication information, wherein the indication information is used for indicating transmission information of a power-saving reference signal (PSRS); and send the PSRS according to the transmission information of the PSRS.

An embodiment of the present disclosure further provides an information sending device, including:

a transceiving module, configured to: send indication information, wherein the indication information is used for indicating transmission information of a power-saving reference signal (PSRS); and send the PSRS according to the transmission information of the PSRS.

An embodiment of the present disclosure further provides a network device, including: a processor configured to perform following functions:

sending indication information, wherein the indication information is used for indicating transmission information of a power-saving reference signal (PSRS); and sending the PSRS according to the transmission information of the PSRS.

An embodiment of the present disclosure further provides a terminal, including:

a transceiver, configured to: receive indication information, wherein the indication information is used for indicating transmission information of a power-saving reference signal (PSRS); and receive the PSRS according to the transmission information of the PSRS.

An embodiment of the present disclosure further provides an information receiving device, including:

a transceiving module, configured to: receive indication information, wherein the indication information is used for indicating transmission information of a power-saving reference signal (PSRS); and receive the PSRS according to the transmission information of the PSRS.

An embodiment of the present disclosure further provides a terminal, including: a processor configured to perform following functions:

receiving indication information, wherein the indication information is used for indicating transmission information of a power-saving reference signal (PSRS); and receiving the PSRS according to the transmission information of the PSRS.

An embodiment of the present disclosure further provides a computer storage medium, including instructions, wherein the instructions, when being executed by a computer, cause the computer to implement the methods as described above.

Beneficial effects of embodiments of the present disclosure are as follows: in the above embodiments of the present disclosure, the network device sends indication information for indicating transmission information of the power-saving reference signal (PSRS), and the network device sends the PSRS according to the transmission information of the PSRS, therefore the terminal can make RRM measurement based on the received PSRS.

BRIEF DESCRIPTION OF THE DRAWINGS

In order to more clearly illustrate the technical solution of the embodiments of the present disclosure, the drawings used in the description of the embodiments will be briefly described below, and it is obvious that the drawings in the following description are only some embodiments of the present disclosure, and other drawings can be obtained by those skilled in the art without involving any inventive effort.

DETAILED DESCRIPTION

Figure 1:
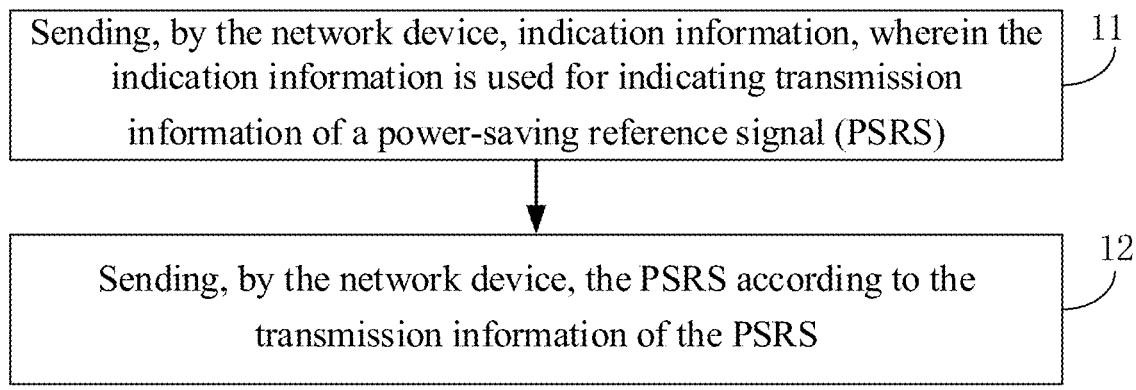
FIG. 1 illustrates a flowchart of an information sending method at a network device side.

Exemplary embodiments of the present disclosure will be described in more detail below with reference to the accompanying drawings. While exemplary embodiments of the disclosure are shown in the drawings, it should be understood that the disclosure may be embodied in various forms and should not be limited to the embodiments set forth herein. Rather, these embodiments are provided so that this disclosure will be thorough and complete, and will fully convey the scope of the disclosure to those skilled in the art.

As shown in FIG. 1, an embodiment of the present disclosure provides an information sending method applied to a network device, and the method includes a step 11 and a step 12.

Step 11, sending, by the network device, indication information, wherein the indication information is used for indicating transmission information of a power-saving reference signal (PSRS); here, the network device may be a base station, such as a 5G NR gNB.

The transmission information of the PSRS includes at least one of a sending position, a sending period and a sending timer of the PSRS.

The sending position of the first PSRS may include: a time position for sending the PSRS, wherein the time position can be the start position of a slot or the start position of a symbol (OFDM); the sending position of the first PSRS may also include a frequency domain resource position, wherein the frequency domain resource position may be a predefined frequency resource pattern or a frequency domain resource position dynamically configured by the network device.

The sending period of the first PSRS may be statically/semi-statically or dynamically configured by the network device, and the network device sends the PSRS at a time instant or in a time window when the sending period of the PSRS is reached.

The sending timer of the first PSRS may be statically/semi-statically or dynamically configured by the network device, and the network device sends the PSRS at a time instant or in a time window when the sending timer expires.

Step 12, sending, by the network device, the PSRS according to the transmission information of the PSRS.

In this embodiment, indication information for indicating transmission information of the PSRS is sent to the terminal by the network device; and the network device sends the PSRS according to the transmission information of the PSRS. Therefore, the terminal can receive the PSRS and perform RRM measurement according to the received PSRS.

In a possible embodiment, the step 11 may include: the network device sends a wakeup signal (WUS) used for indicating transmission information of the PSRS.

The step that the network device sends a wakeup signal WUS may include: the network device sends at least one WUS periodically or aperiodically.

The step that the network device sends at least one WUS periodically or aperiodically may include: the network device periodically or aperiodically sends a first WUS used for indicating transmission information of a first PSRS.

Accordingly, the step 12 may include: in a case that a sending position of the first PSRS indicated by the first WUS is reached before the network device sends a second WUS, the network device sends the first PSRS according to the indication of the first WUS; or in a case that a sending position of a second WUS is reached before the network device sends the first PSRS, the network device sends the second WUS and updates the transmission information of the first PSRS indicated by the first WUS to obtain the transmission information of the second PSRS, and the network device sends the second PSRS according to the indication of the second WUS, wherein the second WUS is used for indicating the transmission information of the second PSRS.

A possible specific implementation of the embodiment is as follows:

a step of sending, by a base station, a first WUS; wherein the first WUS indicates a sending position or a sending period or a sending timer of the PSRS;

a step of sending, by a base station, the first PSRS according to the indication of the first WUS, or sending, by a base station, the second WUS, wherein the second WUS indicates the sending position or the sending period or the sending timer of the second PSRS.

Specifically, if the sending position of the first PSRS indicated by the first WUS is reached before the base station sends the second WUS, the base station sends the first PSRS according to indication of the first WUS.

If the sending position of the second WUS is reached before the base station sends the first PSRS, the base station updates the transmission information of the first PSRS indicated by the first WUS to obtain transmission information of the second PSRS, that is, the second PSRS is the updated first PSRS, and the transmission information of the second PSRS is the same as or partially the same as or different from the transmission information of the first PSRS; here, the second WUS is used to indicate transmission information of the second PSRS.

Figure 2:
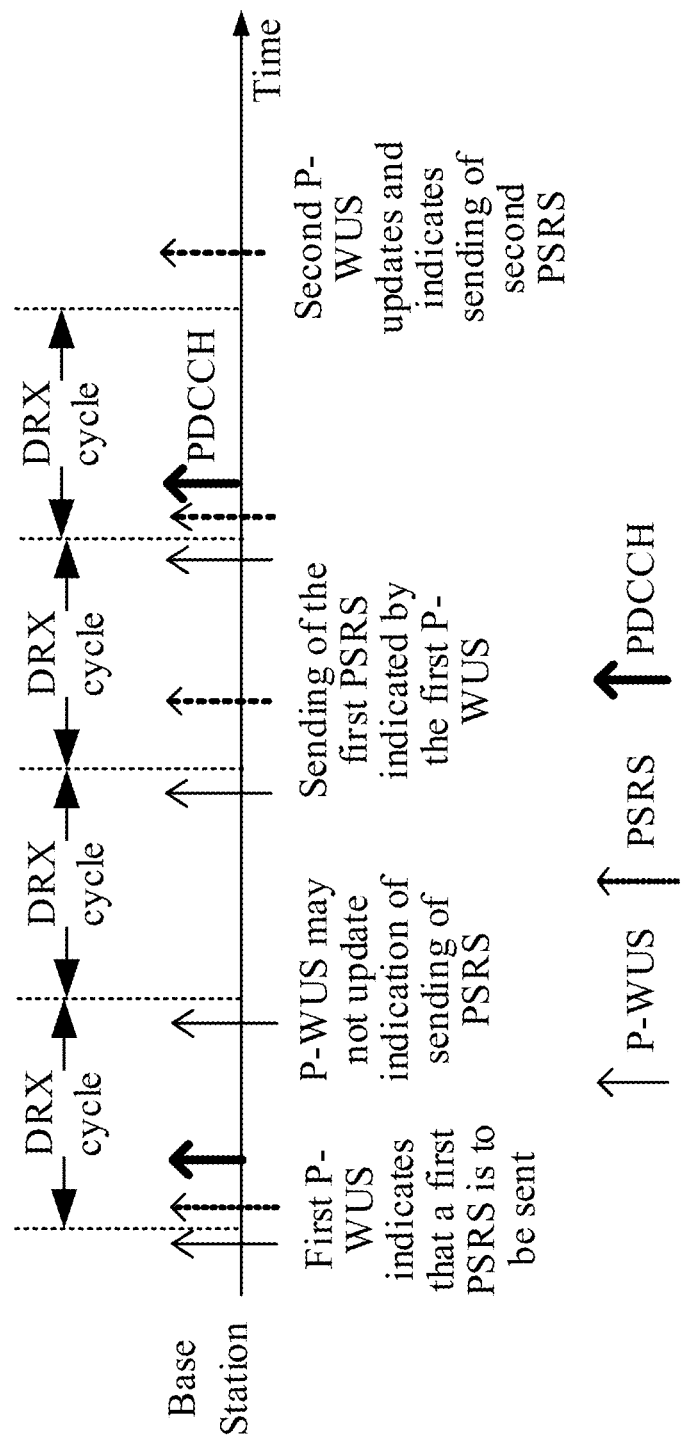
FIG. 2 illustrates a diagram of a first example of an implementation process of sending by a network device a WUS indicating transmission information of a PSRS.

FIG. 2 illustrates a first implementation case of a specific implementation process of the sending, by the network device, a wakeup signal (WUS), wherein the WUS is used for indicating transmission information of the PSRS, and the sending, by the network device, the PSRS according to the transmission information of the PSRS in the foregoing embodiment, in which the network device periodically sends the WUS (P-WUS) and the P-WUS is sent at the time instant when the period is reached, and the terminal only detects the WUS at the fixed time instant when the P-WUS period is reached. If there is no PDCCH, the P-WUS indicates that the UE does not need to detect the PDCCH, and the specific implementation process includes a step 1 and a step 2.

Step 1: the base station sends a first WUS; the first WUS indicates a sending position or a sending period or a sending timer of the first PSRS.

The sending position of the first PSRS may include a time position for sending the PSRS, wherein the time position may be a start position of a slot or a start position of a symbol; the sending position of the first PSRS may also include a frequency domain resource position, wherein the frequency domain resource position may be a predefined frequency resource pattern or a frequency domain resource position dynamically configured by the base station.

The sending period of the first PSRS may be statically/semi-statically or dynamically configured by the network device, and the network device sends the PSRS at a time instant or in a time window when the sending period of the PSRS is reached.

The sending timer of the first PSRS may be statically/semi-statically or dynamically configured by the network device, and the network device sends the PSRS at the time instant or in a time window when the sending timer expires.

Step 2: the base station sends the first PSRS according to indication of the first WUS, or the base station sends a second WUS indicating a sending position or a sending period or a sending timer of the second PSRS.

Specifically, if the sending position of the first PSRS indicated by the first WUS is reached before the base station sends the second WUS, the base station sends the first PSRS according to indication of the first WUS.

If a sending position of the second WUS is reached before the base station sends the first PSRS, the second WUS is sent, the base station updates the transmission information of the first PSRS indicated by the first WUS to obtain the transmission information of the second PSRS, that is, the second PSRS is the updated first PSRS, the transmission information of the first PSRS is invalid, and the second WUS indicates that the transmission information of the second PSRS is valid. Further, the transmission information of the second PSRS indicated by the second WUS may be the same as or different from or partially the same as the transmission information of the first PSRS indicated by the first WUS.

In the embodiment, a first P-WUS indicates that the first PSRS is to be sent, the first PSRS is sent at a first preset position of a DRX cycle, and the first preset position can be indicated by a first P-WUS in a previous DRX cycle. Furthermore, after the first PSRS is sent, downlink information such as a PDCCH may also be sent, or the PDCCH may not be sent, and if in some DRX cycles the first P-WUS does not indicate that the PDCCH is to be sent, the UE does not need to detect the PDCCH.

Figure 3:
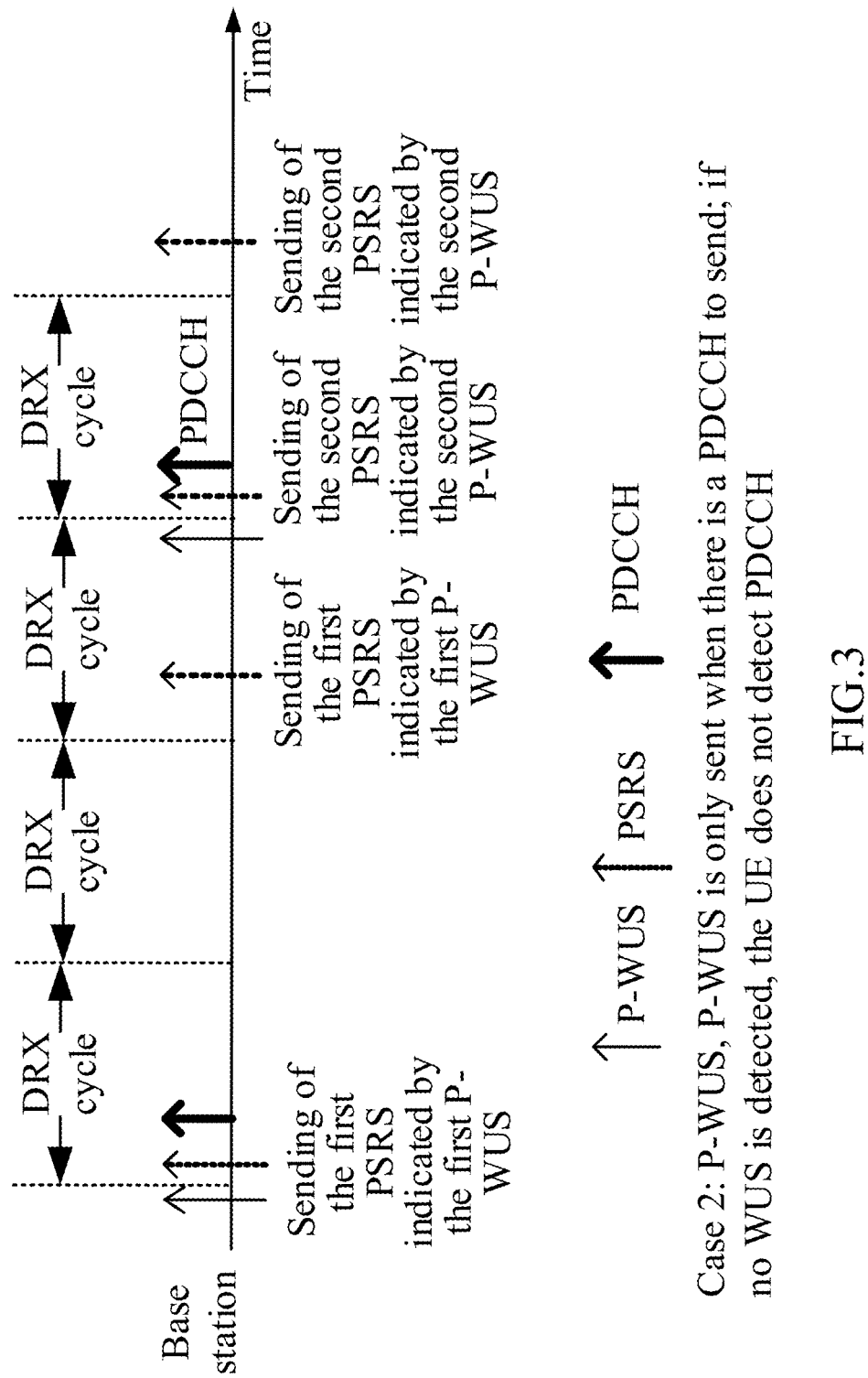
FIG. 3 illustrates a diagram of a second example of an implementation process of sending by a network device a WUS indicating transmission information of a PSRS.

FIG. 3 illustrates a second implementation case of a specific implementation process of the sending, by the network device, a WUS, wherein the WUS is used for indicating transmission information of the PSRS, and the sending, by the network device, the PSRS according to the transmission information of the PSRS in the foregoing embodiment, in which the network device periodically sends the WUS (P-WUS) and the P-WUS is only sent at the time instant when not only the sending period is reached but also there is PDCCH to send, and the terminal only detects the WUS at the fixed time instant when the P-WUS period is reached. If the terminal does not detect the P-WUS, the UE does not detect the PDCCH, and the detailed process is the same as that described with respect to FIG. 2.

In this embodiment, the first P-WUS indicates that a first PSRS is to be sent, the first PSRS is sent at a first preset position of the DRX cycle, the first preset position may be indicated by the first P-WUS in the previous DRX cycle, and the first P-WUS also indicates that downlink information, such as PDCCH, is to be sent after sending of the first PSRS. It should be noted that in this embodiment, the first PSRS indicated by the first P-WUS may be sent in at least one DRX cycle subsequent to the DRX cycle in which the first P-WUS is located, e.g., the first PSRS may be sent in a first DRX cycle subsequent to the DRX cycle in which the first P-WUS is located, a PDCCH is sent in the first DRX cycle simultaneously; the first PSRS is not sent in the second DRX cycle after the DRX cycle in which the first P-WUS is located and no PDCCH is sent in the second DRX cycle; and the first PSRS is sent in the third DRX cycle after the DRX cycle in which the first P-WUS is located, but no PDCCH is sent in the third DRX cycle after the DRX cycle in which the first P-WUS is located.

Figure 4:
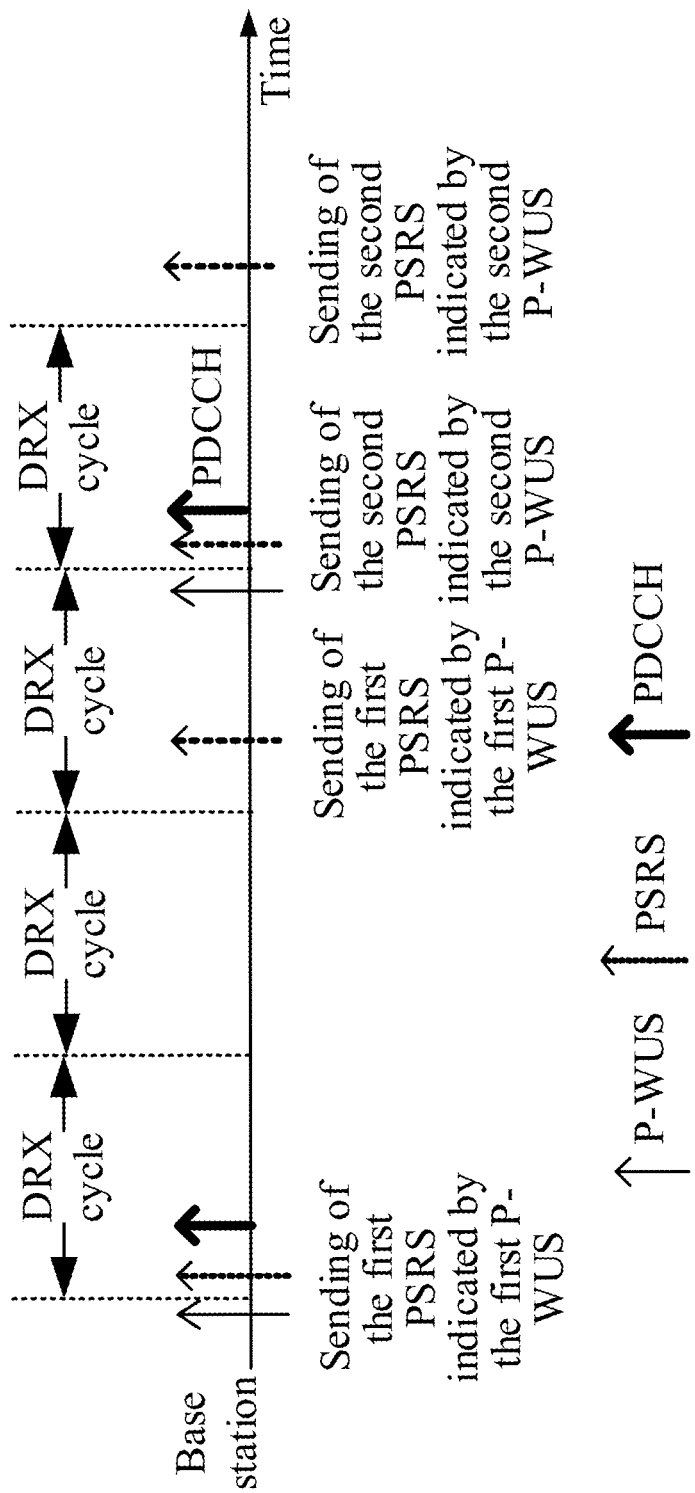
FIG. 4 illustrates a diagram of a third example of an implementation process of sending by a network device a WUS indicating transmission information of a PSRS.

FIG. 4 illustrates a third implementation case of a specific implementation process of the sending, by the network device, a WUS, wherein the WUS is used for indicating transmission information of the PSRS, and the sending, by the network device, the PSRS according to the transmission information of the PSRS in the foregoing embodiment, in which the base station may configure aperiodic WUS (A-WUS), and when no PDCCH is to be sent, the A-WUS is not sent; when there is PDCCH to send, the base station sends the A-WUS. The terminal continuously attempts to receive the WUS at any time, and when the received power or the received energy meets a first threshold, the UE detects the WUS and is awakened to perform PDCCH detection. The first threshold is a real number. The detailed process is the same as that shown in the FIG. 2 above.

In this embodiment, the first P-WUS indicates that a first PSRS is to be sent, the first PSRS is sent at a first preset position of the DRX cycle, the first preset position may be indicated by the first P-WUS in the previous DRX cycle, and the first P-WUS also indicates that downlink information, such as PDCCH, is to be sent after sending of the first PSRS. It should be noted that in this embodiment, the first PSRS indicated by the first P-WUS may be sent in at least one DRX cycle subsequent to the DRX cycle in which the first P-WUS is located, e.g., the first PSRS may be sent in a first DRX cycle subsequent to the DRX cycle in which the first P-WUS is located and a PDCCH is sent in the first DRX cycle simultaneously; the first PSRS is not sent in the second DRX cycle after the DRX cycle in which the first P-WUS is located and no PDCCH is sent in the second DRX cycle; and the first PSRS is sent in the third DRX cycle after the DRX cycle in which the first P-WUS is located, but no PDCCH is sent in the third DRX cycle after the DRX cycle in which the first P-WUS is located.

In some other possible embodiments, the step 11 may include: the network device sends static, semi-static or dynamic signaling indicating transmission information of the PSRS.

Specifically, the step that the network device sends the static, semi-static or dynamic signaling includes: the network device sends the static, semi-static or dynamic signaling during sending of the first downlink information.

Accordingly, the step 12 may include: in a case that a sending position of a first PSRS indicated by the first static, semi-static or dynamic signaling is reached before the network device sends second downlink information, the first PSRS is sent according to the indication of the first static, semi-static or dynamic signaling; or in a case that the sending position of second downlink information is reached before the network device sends a first PSRS, the network device sends the second downlink information, updates transmission information of the first PSRS indicated by the first static, semi-static or dynamic signaling to obtain a second PSRS, sends second static, semi-static or dynamic signaling and sends the second PSRS according to the indication of the second static, semi-static or dynamic signaling, wherein the second static, semi-static or dynamic signaling is used for indicating transmission information of the second PSRS.

The static, semi-static signaling includes: radio resource control (RRC) signaling or medium access control control element (MAC CE) signaling; the dynamic signaling includes: downlink control information (DCI) or go-to-sleep (GTS) signaling. The first downlink information and the second downlink information include: downlink data information (e.g., PDSCH) or downlink control information (e.g., PDCCH) or downlink system information or other downlink information.

A specific implementations process of the other possible embodiments includes:
a step of sending, by the base station, first downlink information; the downlink information sent by the base station can be PDCCH scheduling information, PDSCH information and DL reference signal information, including a synchronous signal SSB, a measurement signal CSI-RS and the like;
a step of indicating, by the base station, a sending position or a sending period or a sending timer of the first PSRS through a static/semi-static first RRC signaling indication or a first dynamic indication during sending of the first downlink information, i.e. during UE active reception duration;
a step of sending, by the base station, the first PSRS according to the indication by the base station.

Specifically, if the sending position of the first PSRS indicated by the first RRC signaling or the first dynamic indication is reached before the base station sends the second downlink information, the base station sends the first PSRS according to the first RRC signaling indication or the first dynamic indication.

If the sending position of the second downlink information is reached before the base station sends the first PSRS, the second downlink information is sent, the first RRC signaling indication or the first dynamic indication is updated, and the base station configures and sends the second RRC signaling or the second dynamic indication to indicate the transmission information of the second PSRS.

Figure 5:
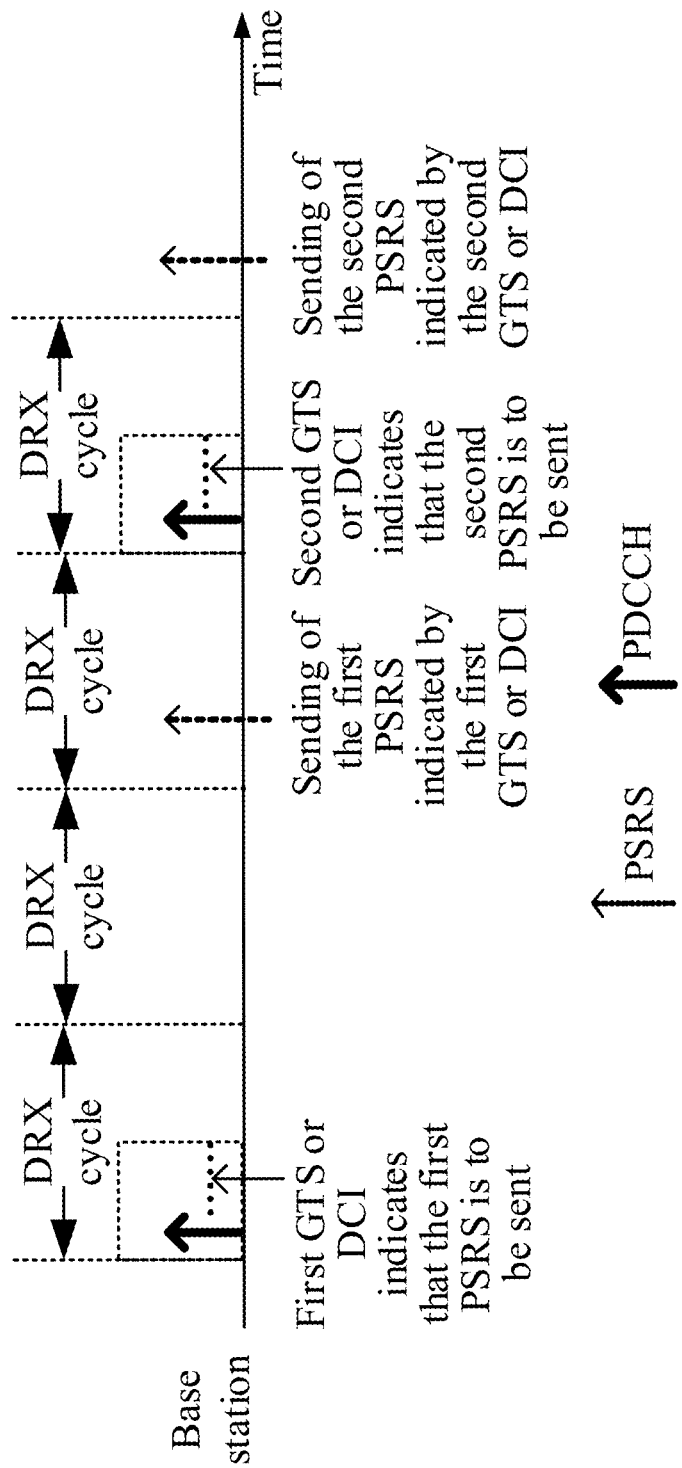
FIG. 5 illustrates a diagram of an example of an implementation process of sending by a network device static/semi-static or dynamic signaling indicating transmission information of the PSRS.

As shown in FIG. 5, in this embodiment, regardless of whether the base station configures a WUS, the base station may indicate statically or semi-statically the sending of the PSRS through the RRC signaling, or indicate the sending of the PSRS through the dynamic signaling. The detailed implementation process is as follows:
    a step of sending, by the base station, the first downlink information;
    a step of indicating, by the base station, a sending position or a sending period or a sending timer of a first PSRS through a static/semi-static first RRC signaling indication or a first dynamic indication (including sending DCI or GTS) during sending of the first downlink information, i.e. during UE active reception duration;
    a step of sending, by the base station, the first PSRS according to the indication by the base station.

Specifically, if the sending position of the first PSRS indicated by the first RRC signaling indication or the first dynamic indication is reached before the base station sends the second downlink information, the base station sends the first PSRS according to the indication.

If the sending position of the second downlink information is reached before the base station sends the first PSRS, the base station sends the second downlink information, updates the transmission information of the first PSRS indicated by the first RRC signaling or updates the transmission information of the first PSRS indicated by the first dynamic signaling to obtain the second PSRS, and the base station configures and sends the second RRC signaling or the second dynamic signaling to indicate the transmission information of the second PSRS.

Further, the transmission information of the second PSRS indicated by the second RRC signaling or the second dynamic signaling may be the same as or different from or partially the same as the transmission information of the first PSRS indicated by the first WUS.

The above-described embodiments of the present disclosure propose a PSRS sending method, so that in a case that the base station configures the PSRS, the base station can indicate a sending position, a sending period or a sending timer of the PSRS through a WUS, or the base station can statically/semi-statically or dynamically configure a sending position, a sending period or a sending timer of the PSRS through RRC configuration in a slot of a UE active duration, or the base station can dynamically indicate or update the sending position, the sending period or the sending timer of the PSRS by using DCI, or the base station can dynamically indicate or update the sending position, the sending period or the sending timer of the PSRS by using a go-to-sleep (GTS) signal. The sending position or the sending period or the sending timer of the PSRS is valid until the next WUS or RRC configuration or DCI indication or GTS signal indication of the base station is correctly received, and the base station sends the subsequent PSRS according to the updated indication. The terminal can thus perform RRM measurement based on the received PSRS.

Figure 6:
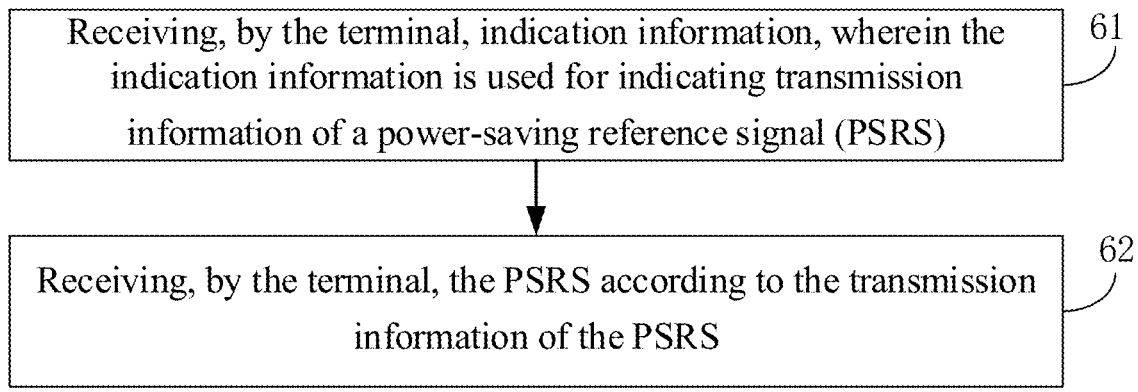
FIG. 6 illustrates a flowchart of a method for receiving information by a terminal.

As shown in FIG. 6, the embodiments of the present disclosure also provide an information receiving method applied to a terminal, and the method includes a step 61 and a step 62.

Step 61, receiving, by the terminal, indication information, wherein the indication information is used for indicating transmission information of a power-saving reference signal (PSRS); wherein the transmission information of the PSRS includes at least one of a receiving position, a receiving period and a receiving timer of the PSRS.

Here, the receiving position of the PSRS is the same as the sending position of the PSRS sent by the network device (i.e., the terminal receives the PSRS at the same position as that at which the base station sends the PSRS), the receiving period is the same as the sending period of the PSRS sent by the network device (i.e., the terminal receives the PSRS at the same period as that at which the base station sends the PSRS), and the receiving timer is the same as the sending timer of the PSRS sent by the network device (i.e., the base station sends the PSRS within the set duration of the sending timer, and the terminal receives the PSRS within the set duration of the timer).

Step 62, receiving, by the terminal, the PSRS according to the transmission information of the PSRS.

In a possible embodiment, the receiving, by the terminal, indication information includes: the terminal receives a wakeup signal (WUS), and the WUS is used for indicating the transmission information of the PSRS.

The step that the terminal receives the wakeup signal (WUS) includes: the terminal receives at least one WUS periodically or aperiodically; the receiving the at least one WUS includes: receiving the first WUS used for indicating transmission information of the first PSRS.

The step that the terminal receives the PSRS according to the transmission information of the PSRS includes:

in a case that a receiving position of the first PSRS indicated by the first WUS is reached before the terminal receives the second WUS, the terminal receives the first PSRS according to the indication of the first WUS; or in a case that a receiving position of a second WUS is reached before the terminal receives the first PSRS, the terminal receives the second WUS and receives the second PSRS according to the indication of the second WUS, wherein the second WUS is used for indicating transmission information of the second PSRS.

The specific process of this possible embodiment includes:

a step of receiving, by the UE, the first WUS sent by a base station, wherein the first WUS indicates the receiving position or the receiving period or the receiving timer of the PSRS;

a step of receiving, by the UE, the first PSRS according to the indication of the first WUS, or receiving, by the UE, the second WUS, wherein the second WUS indicates the receiving position or the receiving period or the receiving timer of the second PSRS;

specifically, if the receiving position of the first PSRS indicated by the first WUS is reached before the UE receives the second WUS, the UE receives the first PSRS according to indication of the first WUS; if the receiving position of the second WUS is reached before the UE receives the first PSRS, the UE receives the second WUS and receives the second PSRS according to the transmission information of the second PSRS indicated by the second WUS;

a step of receiving, by the UE, downlink information sent by the base station, wherein the downlink information can include downlink information (such as PDSCH) or downlink control information (PDCCH) or downlink system information (DCI) or other downlink information;

a step of performing, by the UE, at least one of synchronization, time-frequency tracking and RRM measurement according to the received first PSRS;

wherein the RRM measurement may include measurement of reference signal received power (RSRP) and/or reference signal received quality (RSRQ).

Figure 7:
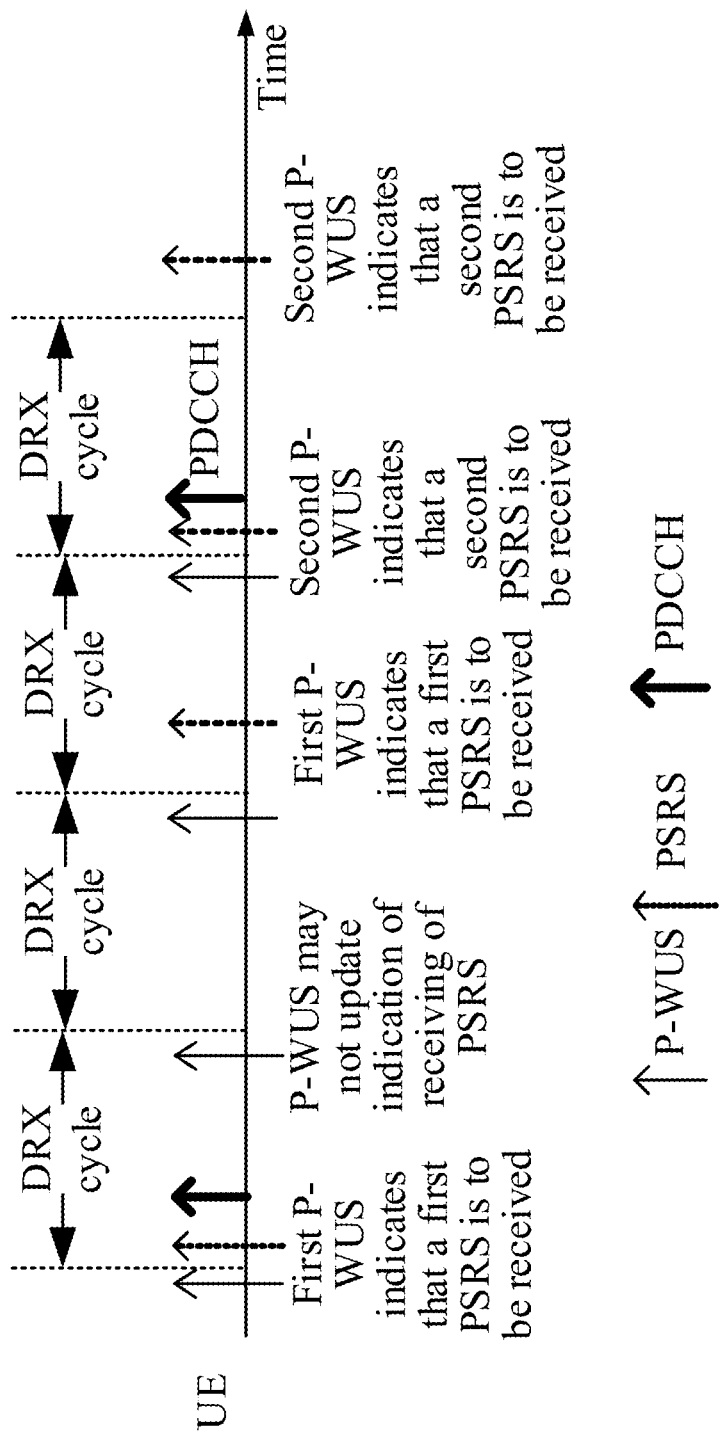
FIG. 7 illustrates a diagram of a first example of an implementation process of receiving by a terminal a WUS indicating transmission information of the PSRS.

FIG. 7 illustrates a first implementation case of a specific implementation process of the receiving, by the terminal, a WUS, wherein the WUS is used for indicating transmission information of the first PSRS, and the receiving, by the terminal, the PSRS according to the transmission information of the PSRS in the foregoing embodiment, in which the network device periodically sends the WUS (P-WUS) and the P-WUS is sent at the time instant when the period is reached, and the terminal only detects the WUS at the fixed time instant when the P-WUS period is reached. If there is no PDCCH, the P-WUS indicates that the UE does not need to detect the PDCCH, and the specific implementation process includes:

a step of receiving, by the UE, the first WUS; the first WUS indicates a receiving position or a receiving period or a receiving timer of the first PSRS;

a step of receiving, by the UE, the first PSRS according to indication of the first WUS, or receiving, by the UE, a second WUS indicating a receiving position or a receiving period or a receiving timer of the second PSRS;

specifically, if the receiving position of the first PSRS indicated by the first WUS is reached before the UE receives the second WUS, the UE receives the first PSRS according to indication of the first WUS; if the receiving position of the second WUS is reached before the terminal receives the first PSRS, the UE receives the second WUS, the second PSRS is received according to the second WUS indication, the transmission information of the first PSRS is invalid, and the transmission information of the second PSRS indicated by the second WUS is valid. Further, the transmission information of the second PSRS indicated by the second WUS may be the same as or different from the transmission information of the first PSRS indicated by the first WUS;

a step of receiving, by the UE, downlink information which can be PDCCH scheduling information, PDSCH information or DL reference signal information, including a synchronous signal SSB, a measurement signal CSI-RS, other downlink information and the like; this step is optional, when the base station sends the first PSRS and sends downlink information, the UE receives the downlink information;

a step of performing, by the UE, at least one of synchronization, time-frequency tracking and RRM measurement according to the received first PSRS; this step is also optional and the terminal may perform at least one of synchronization, time-frequency tracking, and RRM measurement after receiving the first PSRS, certainly other operations may or may not be performed.

In the embodiment, the reception of the first PSRS is performed according to indication of the first P-WUS, the first PSRS is received at a first preset position of a DRX cycle, the first preset position is received through the first P-WUS in the previous DRX cycle, downlink information can also be received after the first PSRS is received, and if in some DRX cycles the first P-WUS does not indicate that a PDCCH is to be received, the UE does not need to detect the PDCCH.

Figure 8:
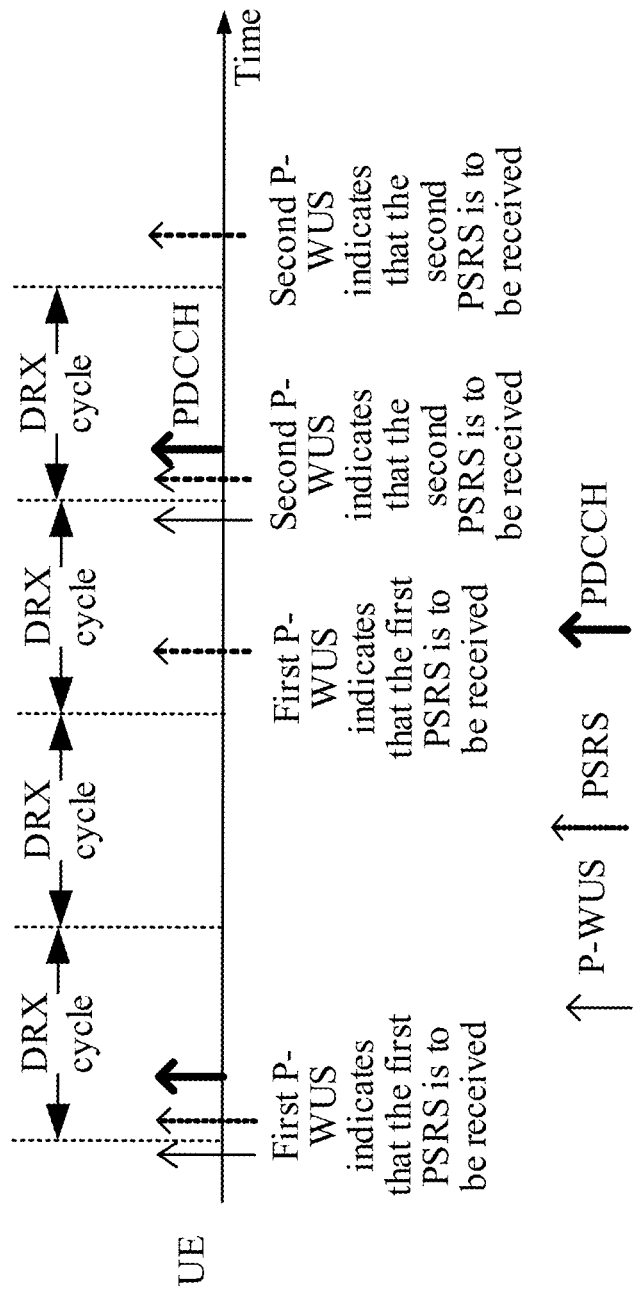
FIG. 8 illustrates a diagram of a second example of an implementation process of receiving by a terminal a WUS indicating transmission information of the PSRS.

FIG. 8 illustrates a second implementation case of a specific implementation process of the receiving, by the terminal, a WUS, wherein the WUS is used for indicating transmission information of the PSRS, and the receiving, by the terminal, the PSRS in the foregoing embodiment, in which the terminal periodically receives the WUS (P-WUS) and the P-WUS is only sent at the time instant when not only the sending period is reached but also there is PDCCH to send, and the terminal only detects the WUS at the fixed time instant when the P-WUS period is reached, and only receives the P-WUS when the PDCCH is being received. If the terminal does not detect the P-WUS, the UE does not detect the PDCCH, and the detailed process is the same as that described with respect to FIG. 7.

In this embodiment, the first P-WUS indicates that the first PSRS is to be received, the first PSRS is received at a first preset position in the DRX cycle, the first preset position is indicated by the first P-WUS in the previous DRX cycle, and the first P-WUS also indicates that downlink information, such as a PDCCH, is to be received after the first PSRS is received. It should be noted that, in this embodiment, the first PSRS indicated by the first P-WUS may be received in at least one DRX cycle subsequent to the DRX cycle in which the first P-WUS is located, e.g., the first PSRS is received in a first DRX cycle subsequent to the DRX cycle in which the first P-WUS is located and a PDCCH is received in the first DRX cycle simultaneously; the first PSRS is not received in the second DRX cycle after the DRX cycle in which the first P-WUS is located and no PDCCH is received in the second DRX cycle; and the first PSRS is received in the third DRX cycle after the DRX cycle in which the first P-WUS is located, but no PDCCH is received in the third DRX cycle after the DRX cycle in which the first P-WUS is located.

Figure 9:
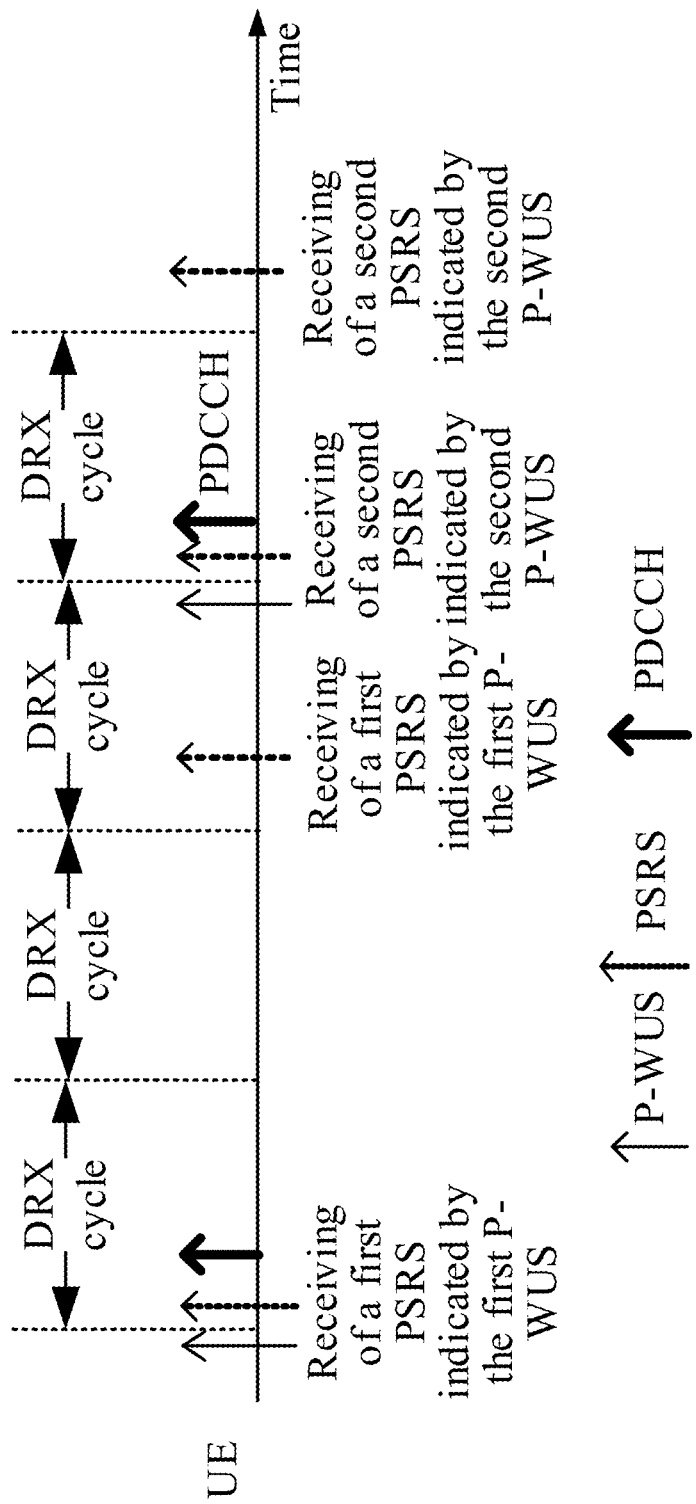
FIG. 9 illustrates a diagram of a third example of an implementation process of receiving by a terminal a WUS indicating transmission information of the PSRS.

FIG. 9 illustrates a third implementation case of a specific implementation process of the receiving, by the terminal, a WUS, wherein the WUS is used for indicating transmission information of the PSRS, and the receiving, by the terminal, the PSRS according to the transmission information of the PSRS in the foregoing embodiment, in which the base station may configure aperiodic WUS (A-WUS), and when no PDCCH is to be sent, the A-WUS is not sent; when there is PDCCH to send, the base station sends the A-WUS. The terminal continuously attempts to receive the WUS at any time, and when the received power or the received energy meets a first threshold, the UE detects the WUS and is awakened to perform PDCCH detection. When there is no PDCCH to receive, the A-WUS is not received; when there is a PDCCH to receive, the A-WUS is received. The first threshold is a real number. The detailed process is the same as that shown in the FIG. 2 above.

In this embodiment, the first P-WUS indicates that the first PSRS is to be received, the first PSRS is received at a first preset position in the DRX cycle, the first preset position is indicated by the first P-WUS in the previous DRX cycle, and the first P-WUS also indicates that downlink information, such as a PDCCH, is to be received after the first PSRS is received. It should be noted that in this embodiment, the first PSRS indicated by the first P-WUS may be received in at least one DRX cycle subsequent to the DRX cycle in which the first P-WUS is located, e.g., the first PSRS is received in the first DRX cycle subsequent to the DRX cycle in which the first P-WUS is located and a PDCCH is received in the first DRX cycle simultaneously; the first PSRS is not received in the second DRX cycle after the DRX cycle in which the first P-WUS is located and no PDCCH is received in the second DRX cycle; and the first PSRS is received in the third DRX cycle after the DRX cycle in which the first P-WUS is located, but no PDCCH is received in the third DRX cycle after the DRX cycle in which the first P-WUS is located.

In other possible embodiments, the step that the terminal receives static, semi-static or dynamic signaling includes: the terminal receives static, semi-static or dynamic signaling during receiving of the first downlink information.

The step that the terminal receives the PSRS according to the transmission information of the PSRS includes: in a case that the receiving position of the first PSRS indicated by the first static, semi-static or dynamic signaling is reached before the terminal receives the second downlink information, the first PSRS is received according to the indication of the first static, semi-static or dynamic signaling; or in a case that the receiving position of the second downlink data information is reached before the terminal receives the first PSRS, the terminal receives the second downlink information, receives second static, semi-static or dynamic signaling, and receives the second PSRS according to the indication of the second static, semi-static or dynamic signaling, wherein the second static, semi-static or dynamic signaling is used for indicating transmission information of the second PSRS.

The static or semi-static signaling includes: radio resource control (RRC) signaling or medium access control control element (MAC CE) signaling; the dynamic signaling includes: downlink control information (DCI) or go-to-sleep (GTS) signaling. The first downlink information and the second downlink information include: downlink data information or downlink control information or downlink system information.

A specific implementation process of the other possible embodiments is as follows:
  a step of receiving, by the UE, first downlink information; the downlink information received by the UE can be PDCCH scheduling information, PDSCH information or DL reference signal information, including the synchronization signal SSB, the measurement signal CSI-RS and other downlink information;
  a step of receiving, by the UE, the static/semi-static first RRC signaling indication or the first dynamic indication (including reception of DCI or GTS) by the base station during receiving of the first downlink information, i.e., during UE active reception, wherein the first RRC signaling indication or the first dynamic indication is used for indicating the receiving position or the receiving period or the receiving timer of the first PSRS; receiving, by the UE, the first PSRS according to the indication by the base station;
  specifically, if the receiving position of the first PSRS indicated by the first RRC signaling indication or the first dynamic indication is reached before the UE receives the second downlink information, the UE receives the first PSRS according to the indication; if the receiving position of second downlink information is reached before the UE receives the first PSRS, the UE receives the second downlink information, and updates transmission information of the first PSRS indicated by the first RRC signaling indication or the first dynamic indication, and the base station configures and sends the second RRC signaling indication or the second dynamic indication to indicate the transmission information of the second PSRS;
  a step of performing, by the UE, at least one of synchronization, time-frequency tracking and RRM measurement according to the received first PSRS;
  the RRM measurement may include RSRP and/or RSRQ measurement.

Figure 10:
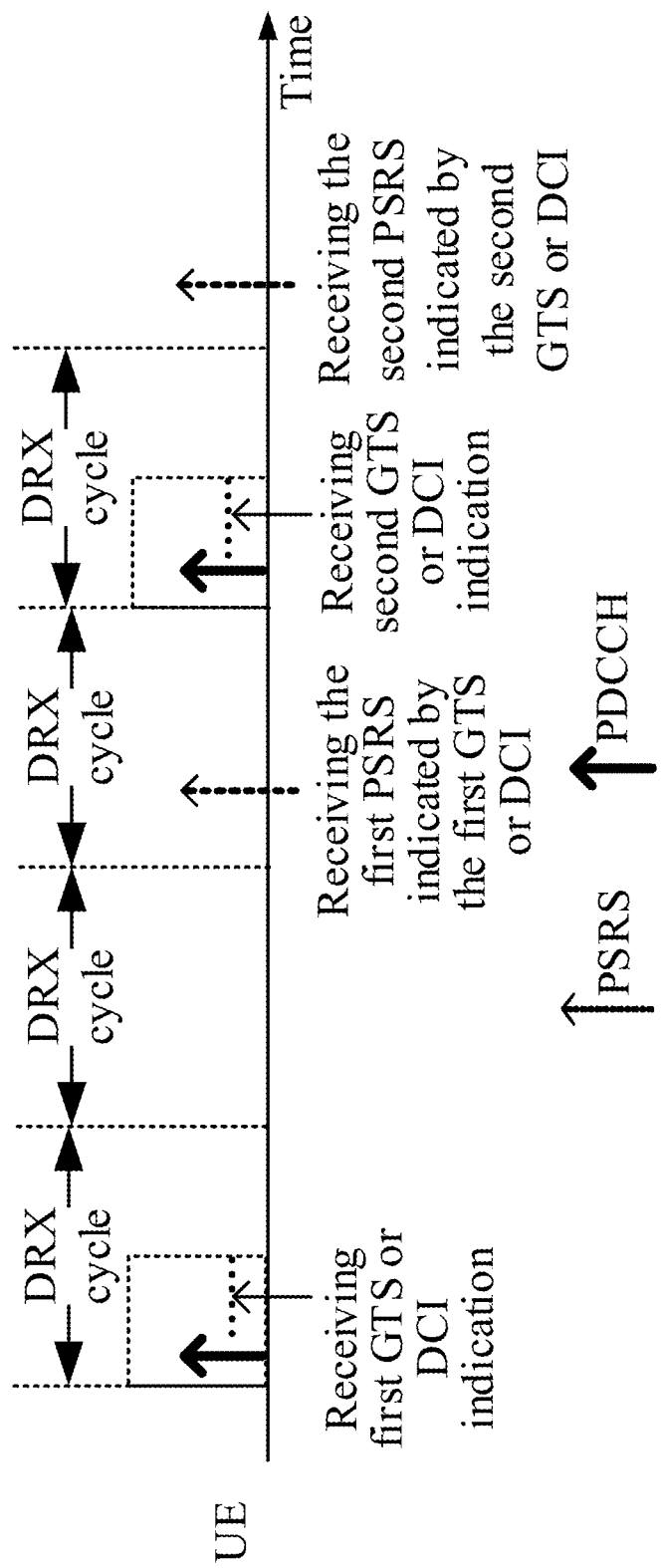
FIG. 10 illustrates a diagram of an example of an implementation process of receiving by a terminal static/semi-static or dynamic signaling indicating transmission information of the PSRS.

As shown in FIG. 10, in this embodiment, regardless of whether the base station configures the WUS, the terminal may indicate receiving of the PSRS through static or semi-static RRC signaling, or through dynamic signaling. The detailed implementation process is as follows:
  a step of receiving, by the UE, the first downlink information;
  a step of receiving, by the UE, the PSRS during the first downlink information, i.e., during UE active reception; specifically, the PSRS indication information may be the static/semi-static first RRC signaling indication by the base station, or a first dynamic indication (including transmission of DCI or GTS) configured by the base station, wherein the first RRC signaling or the first dynamic indication is used for indicating the receiving position or the receiving period or the receiving timer of the first PSRS;
  further, if the receiving position of the first PSRS indicated by the first RRC signaling indication or the first dynamic indication is reached before the UE receives the second downlink information, the UE receives the first PSRS according to the first RRC signaling indication or the first dynamic indication; if the receiving position of the second downlink information is reached before the UE receives the first PSRS, the second downlink information is received, then the second RRC signaling indication or the second dynamic indication is received, the second PSRS is received according to the transmission information of the second PSRS indicated by the second RRC signaling indication or the second dynamic indication, the transmission information of the first PSRS is invalid, and the transmission information of the second PSRS indicated by the second WUS is valid; further, the transmission information of the second PSRS indicated by the second WUS may be the same as or different from or partially the same as the transmission information of the first PSRS indicated by the first WUS;
  a step of performing, by the UE, at least one of synchronization, time-frequency tracking and RRM measurement according to the received first PSRS.

The above embodiment of the present disclosure proposes a PSRS receiving method. Based on the embodiment, the base station dynamically indicates the receiving position, the receiving period and the receiving timer of the PSRS through WUS or RRC signaling or GTS or DCI, so that the PSRS is received and RRM measurement is carried out in a discontinuous receiving state of the UE, and RRM measurement and RRC connection are maintained while certain power saving effect is ensured.

Figure 11:
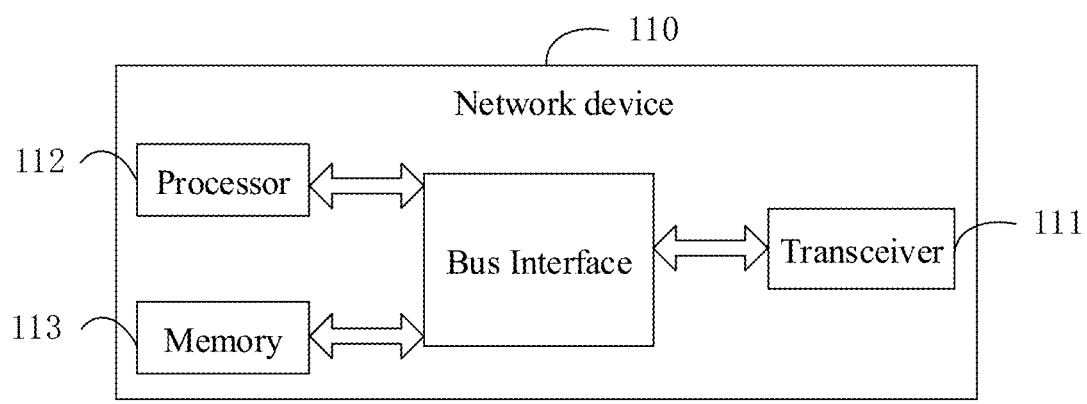
FIG. 11 is a diagram of an architecture of a network device.

As shown in FIG. 11, an embodiment of the present disclosure further provides a network device 110, including:
  a transceiver 111 configured to: send indication information, wherein the indication information is used for indicating transmission information of a power-saving reference signal (PSRS); and send the PSRS according to the transmission information of the PSRS.

Optionally, the transmission information of the PSRS includes at least one of a sending position, a sending period and a sending timer of the PSRS.

Optionally, the sending, by the network device, the indication information includes:
  sending, by the network device, a wakeup signal (WUS), wherein the WUS is used for indicating the transmission information of the PSRS; or sending, by the network device, static, semi-static or dynamic signaling, wherein the static, semi-static or dynamic signaling is used for indicating the transmission information of the PSRS.

Optionally, the sending, by the network device, the wakeup signal (WUS) includes:
  sending, by the network device, at least one WUS periodically or aperiodically.

Optionally, the sending the at least one WUS includes:
  sending a first WUS, wherein the first WUS is used for indicating transmission information of a first PSRS.

Optionally, the sending, by the network device, the PSRS according to the transmission information of the PSRS includes:
  in a case that a sending position of the first PSRS indicated by the first WUS is reached before the network device sends a second WUS, sending, by the network device, the first PSRS according to indication of the first WUS; or in a case that a sending position of a second WUS is reached before the network device sends the first PSRS, sending, by the network device, the second WUS and updating, by the network device, the transmission information of the first PSRS indicated by the first WUS to obtain transmission information of a second PSRS, and sending, by the network device, the second PSRS according to indication of the second WUS, wherein the second WUS is used for indicating the transmission information of the second PSRS.

Optionally, the sending, by the network device, the static, semi-static or dynamic signaling includes:
sending, by the network device, the static, semi-static or dynamic signaling during sending of first downlink information.

Optionally, the sending, by the network device, the PSRS according to transmission information of the PSRS includes:
in a case that a sending position of a first PSRS indicated by first static, semi-static or dynamic signaling is reached before the network device sends second downlink information, sending the first PSRS according to indication of the first static, semi-static or dynamic signaling; or in a case that a sending position of second downlink information is reached before the network device sends a first PSRS, sending, by the network device, the second downlink information, updating, by the network device, transmission information of the first PSRS indicated by the first static, semi-static or dynamic signaling to obtain transmission information of a second PSRS, sending, by the network device, second static, semi-static or dynamic signaling and sending, by the network device, the second PSRS according to indication of the second static, semi-static or dynamic signaling, wherein the second static, semi-static or dynamic signaling is used for indicating the transmission information of the second PSRS.

Optionally, the static or semi-static signaling includes: radio resource control (RRC) signaling or medium access control control element (MAC CE) signaling; the dynamic signaling includes: downlink control information (DCI) or go-to-sleep (GTS) signaling; the first downlink information and the second downlink information include: downlink data information or downlink control information or downlink system information.

It should be noted that the embodiment of the network device is a device corresponding to the above-mentioned PSRS sending method at the network device side, and all the implementations of the above-mentioned method embodiment are applicable to the embodiment of the terminal, and the same technical effects can be achieved.

The network device 110 may further include: a memory 113 in communication connection with a processor 112 or the transceiver 111 via a bus interface or an interface. The functions of the transceiver 111 may also be implemented by the processor 112.

An embodiment of the present disclosure further provides an information sending device. The information sending device is applied to a network device and includes a transceiving module configured to: send indication information, wherein the indication information is used for indicating transmission information of a power-saving reference signal (PSRS); and send the PSRS according to the transmission information of the PSRS.

It should be noted that the embodiment of the device is a device corresponding to the above-mentioned sending method at the network device side, and all the implementations of the method embodiment are applicable to the embodiment of the terminal, and the same technical effects can be achieved.

An embodiment of the present disclosure further provides a network device including: a processor configured to perform the following functions: sending indication information, wherein the indication information is used for indicating the transmission information of the power saving reference signal (PSRS); and sending the PSRS according to the transmission information of the PSRS. All the implementations of the method embodiment at the network device side are applicable to the embodiment of the network device, and the same technical effect can be achieved.

Figure 12:
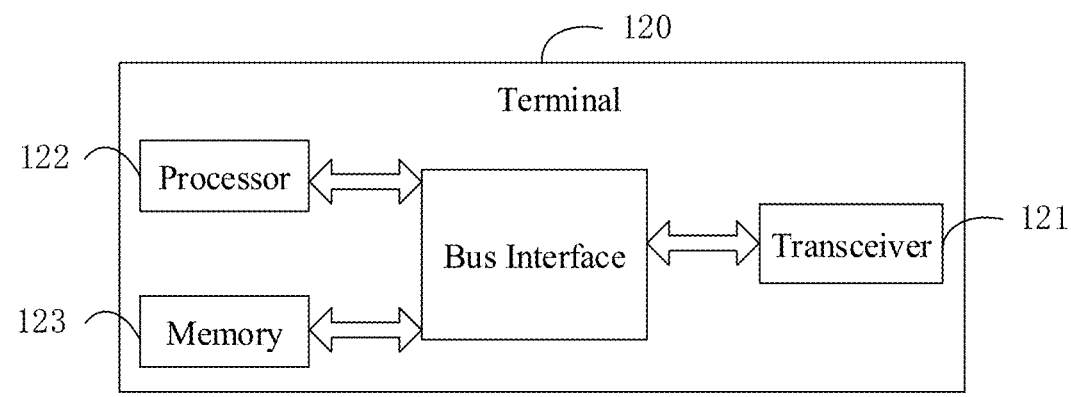
FIG. 12 is a diagram of an architecture of a terminal.

As shown in FIG. 12, an embodiment of the present disclosure further provides a terminal 120, including:
a transceiver 121 configured to: receive indication information, wherein the indication information is used for indicating transmission information of a power-saving reference signal (PSRS); and receive the PSRS according to the transmission information of the PSRS.

Optionally, the transmission information of the PSRS includes at least one of a receiving position, a receiving period and a receiving timer of the PSRS.

Optionally, the receiving, by the terminal, the indication information includes:
receiving, by the terminal, a wakeup signal (WUS), wherein the WUS is used for indicating the transmission information of the PSRS; or
receiving, by the terminal, static, semi-static or dynamic signaling, wherein the static, semi-static or dynamic signaling is used for indicating the transmission information of the PSRS.

Optionally, the receiving, by the terminal, the wakeup signal (WUS) includes:
receiving, by the terminal, at least one WUS periodically or aperiodically.

Optionally, the receiving the at least one WUS includes:
receiving a first WUS, wherein the first WUS is used for indicating transmission information of a first PSRS.

Optionally, the receiving, by the terminal, the PSRS according to the transmission information of the PSRS includes:
in a case that a receiving position of the first PSRS indicated by the first WUS is reached before the terminal receives a second WUS, receiving, by the terminal, the first PSRS according to indication of the first WUS; or in a case that a receiving position of a second WUS is reached before the terminal receives the first PSRS, receiving, by the terminal, the second WUS, and receiving, by the terminal, a second PSRS according to indication of the second WUS, wherein the second WUS is used for indicating transmission information of the second PSRS.

Optionally, the receiving, by the terminal, the static, semi-static or dynamic signaling includes:
receiving, by the terminal, the static, semi-static or dynamic signaling during receiving of first downlink information.

Optionally, the receiving, by the terminal, the PSRS according to transmission information of the PSRS includes:
in a case that a receiving position of a first PSRS indicated by first static, semi-static or dynamic signaling is reached before the terminal receives second downlink information, receiving the first PSRS according to indication of the first static, semi-static or dynamic signaling; or
in a case that a receiving position of second downlink information is reached before the terminal receives a first PSRS, receiving, by the terminal, the second downlink information, receiving, by the terminal, second static, semi-static or dynamic signaling, and receiving, by the terminal, a second PSRS according to indication of the second static, semi-static or dynamic signaling, wherein the second static, semi-static or dynamic signaling is used for indicating transmission information of the second PSRS.

Optionally, the static or semi-static signaling includes: radio resource control (RRC) signaling or medium access control control element (MAC CE) signaling; the dynamic signaling includes: downlink control information (DCI) or go-to-sleep (GTS) signaling; the first downlink information and the second downlink information include: downlink data information or downlink control information or downlink system information.

It should be noted that the embodiment of the terminal is a device corresponding to the above-mentioned PSRS receiving method at the terminal side, and all the implementations of the above-mentioned method embodiment are applicable to the embodiment of the terminal, and the same technical effects can be achieved.

The terminal 120 may further include: a memory 123 in communication connection with a processor 122 or the transceiver 121 via a bus interface or an interface. The functions of the transceiver 121 may also be implemented by the processor 122.

An embodiment of the present disclosure further provides an information receiving device, including:

a transceiving module, configured to: receive indication information, wherein the indication information is used for indicating transmission information of a power-saving reference signal (PSRS); and receive the PSRS according to the transmission information of the PSRS.

It should be noted that the embodiment of the device is a device corresponding to the above-mentioned PSRS receiving method at the terminal side, and all the implementations of the method embodiment are applicable to the embodiment of the terminal, and the same technical effects can be achieved.

An embodiment of the present disclosure further provide a terminal including: a processor configured to perform the following functions: receiving indication information, wherein the indication information is used for indicating transmission information of the power-saving reference signal (PSRS); and receiving the PSRS according to the transmission information of the PSRS.

All the implementations of the method embodiment at the terminal side are applicable to the terminal embodiment, and the same technical effect can be achieved.

An embodiment of the present disclosure further provides a computer storage medium including instructions, wherein the instructions, when being executed by a computer, cause the computer to implement the methods as described above.

Those of ordinary skill in the art will appreciate that the various illustrative elements and algorithm steps described in connection with the embodiments disclosed herein may be implemented as electronic hardware, or a combination of computer software and electronic hardware. Whether such functionality is implemented as hardware or software depends upon the particular application and design constraints imposed on the solution. Skilled artisans may implement the described functionality in varying ways for each particular application, but such implementation decisions should not be interpreted as causing a departure from the scope of the present disclosure.

It will be clear to a person skilled in the art that, for the convenience and brevity of description, the specific workings of the systems, devices and units described above may be referred to in the corresponding process of the preceding method embodiments and will not be described in detail here.

In the several embodiments provided in this application, it should be understood that the disclosed method and device may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electrical, mechanical, or other forms.

The elements illustrated as separate elements may or may not be physically separate, and the elements shown as elements may or may not be physical elements, i.e., may be located in one place, or may be distributed across multiple network elements. Some or all of the elements may be selected as necessary to achieve the objectives of the present embodiment.

In addition, various functional units in the embodiments of the present disclosure may be integrated into one processing unit, or each of the units may exist alone physically, or two or more functional units may be integrated into one unit.

The functions, if implemented in software functional units and sold or used as stand-alone products, may be stored in a computer readable storage medium. On the basis of this understanding, the technical solution of the present disclosure, or parts contributing to the related art, may be embodied in the form of a software product stored in a storage medium including instructions for causing a computer device (may be a personal computer, a server, or network device or the like) to perform all or part of the steps of the methods described in the various embodiments of the present disclosure. The foregoing storage medium includes any medium that can store program code, such as a Universal Serial Bus (USB) flash drive, a removable hard disk, a Read-Only Memory (ROM), a Random Access Memory (RAM), a magnetic disk, or an optical disc.

Furthermore, it should be noted that in the devices and methods of the present disclosure, it is apparent that the components or steps may be disassembled and/or recombined. Such decomposition and/or recombination should be considered as equivalents of the present disclosure. Also, the steps of performing the above series of processes may naturally be performed chronologically in the order illustrated, but need not necessarily be performed chronologically, and some steps may be performed in parallel or independently of one another. One of ordinary skill in the art will appreciate that all or any of the steps or components of the methods and devices of the present disclosure may be implemented in hardware, firmware, software, or a combination thereof in any computing device (including processors, storage media, etc.) or network of computing devices, which can be accomplished by one of ordinary skill in the art having read this disclosure using their basic programming skills.

Thus, the objects of the present disclosure may also be achieved by running a program or a set of programs on any computing device. The computing device may be a known general purpose device. Accordingly, the objects of the present disclosure may also be achieved simply by providing a program product containing program code that implements the method or devices. That is, such a program product also constitutes the present disclosure, and a storage medium storing such a program product also constitutes the present disclosure. Obviously, the storage medium may be any known storage medium or any storage medium developed in the future. It should also be noted that in the apparatus and method of the present disclosure, it is apparent that the components or steps may be disassembled and/or recombined. Such decomposition and/or recombination should be considered as equivalents of the present disclosure. Also, the steps for performing the series of processes described above may naturally be performed chronologically in the order illustrated, but need not necessarily be performed chronologically. Some steps may be performed in parallel or independently of each other.

It is to be understood that the embodiments described by the embodiments of the present disclosure may be implemented in hardware, software, firmware, middleware, microcode, or a combination thereof. For a hardware implementation, the processing elements may be implemented on one or more application specific integrated circuits (ASICs), digital signal processors (DSPs), digital signal processing devices (DSPDs), programmable logic devices (PLDs), field programmable gate arrays (FPGAs), general-purpose processors, controllers, microcontrollers, microprocessors, other electronic units for performing the functions described in this disclosure, or a combination thereof.

For a software implementation, the techniques described herein may be implemented with modules (e.g., procedures, functions, and so on) that perform the functions described herein. The software codes may be stored in a memory and executed by a processor. The memory may be implemented in the processor or external to the processor.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. An information sending method, applied to a network device, comprising:
    sending, by the network device, indication information, wherein the indication information is used for indicating transmission information of a power-saving reference signal (PSRS); and
    sending, by the network device, the PSRS according to the transmission information of the PSRS;
    wherein the sending, by the network device, the indication information comprises:
    sending, by the network device, a wakeup signal (WUS), wherein the WUS is used for indicating the transmission information of the PSRS; or
    sending, by the network device, static, semi-static or dynamic signaling during sending of first downlink information, wherein the static, semi-static or dynamic signaling is used for indicating the transmission information of the PSRS, and the sending, by the network device, the PSRS according to transmission information of the PSRS comprises:
    in a case that a sending position of a first PSRS indicated by first static, semi-static or dynamic signaling is reached before the network device sends second downlink information, sending the first PSRS according to indication of the first static, semi-static or dynamic signaling; or
    in a case that a sending position of second downlink information is reached before the network device sends a first PSRS, sending, by the network device, the second downlink information, updating, by the network device, transmission information of the first PSRS indicated by the first static, semi-static or dynamic signaling to obtain transmission information of a second PSRS, sending, by the network device, second static, semi-static or dynamic signaling and sending, by the network device, the second PSRS according to indication of the second static, semi-static or dynamic signaling, wherein the second static, semi-static or dynamic signaling is used for indicating the transmission information of the second PSRS.

2. The information sending method according to claim 1, wherein the transmission information of the PSRS comprises at least one of a sending position, a sending period and a sending timer of the PSRS.

3. The information sending method according to claim 1, wherein the sending, by the network device, the wakeup signal (WUS) comprises:
    sending, by the network device, at least one WUS periodically or aperiodically.

4. The information sending method according to claim 3, wherein the sending the at least one WUS comprises:
    sending a first WUS, wherein the first WUS is used for indicating transmission information of a first PSRS.

5. The information sending method according to claim 4, wherein the sending, by the network device, the PSRS according to the transmission information of the PSRS comprises:
    in a case that a sending position of the first PSRS indicated by the first WUS is reached before the network device sends a second WUS, sending, by the network device, the first PSRS according to indication of the first WUS; or
    in a case that a sending position of a second WUS is reached before the network device sends the first PSRS, sending, by the network device, the second WUS and updating, by the network device, the transmission information of the first PSRS indicated by the first WUS to obtain transmission information of a second PSRS, and sending, by the network device, the second PSRS according to indication of the second WUS, wherein the second WUS is used for indicating the transmission information of the second PSRS.

6. A network device, comprising: a processor, a memory and a computer program stored in the memory and configured to be executed by the processor, wherein the processor is configured to execute the computer program to cause the network device to implement the steps of the method according to claim 1.

7. A non-transitory computer storage medium, comprising instructions, wherein the instructions, when being executed by a computer, cause the computer to implement the method according to claim 1.

8. An information receiving method, applied to a terminal, comprising:
    receiving, by the terminal, indication information, wherein the indication information is used for indicating transmission information of a power-saving reference signal (PSRS); and
    receiving, by the terminal, the PSRS according to the transmission information of the PSRS;
    wherein the receiving, by the terminal, the indication information comprises:
    receiving, by the terminal, a wakeup signal (WUS), wherein the WUS is used for indicating the transmission information of the PSRS; or receiving, by the terminal, static, semi-static or dynamic signaling during receiving of first downlink information, wherein the static, semi-static or dynamic signaling is used for indicating the transmission information of the PSRS, and the receiving, by the terminal, the PSRS according to transmission information of the PSRS comprises:

in a case that a receiving position of a first PSRS indicated by first static, semi-static or dynamic signaling is reached before the terminal receives second downlink information, receiving the first PSRS according to indication of the first static, semi-static or dynamic signaling; or in a case that a receiving position of second downlink information is reached before the terminal receives a first PSRS, receiving, by the terminal, the second downlink information, receiving, by the terminal, second static, semi-static or dynamic signaling, and receiving, by the terminal, a second PSRS according to indication of the second static, semi-static or dynamic signaling, wherein the second static, semi-static or dynamic signaling is used for indicating transmission information of the second PSRS.

9. The information receiving method according to claim 8, wherein the transmission information of the PSRS comprises at least one of a receiving position, a receiving period and a receiving timer of the PSRS.

10. The information receiving method according to claim 8, wherein the receiving, by the terminal, the wakeup signal (WUS) comprises:

receiving, by the terminal, at least one WUS periodically or aperiodically.

11. The information receiving method according to claim 10, wherein the receiving the at least one WUS comprises:

receiving a first WUS, wherein the first WUS is used for indicating transmission information of a first PSRS.

12. The information receiving method according to claim 11, wherein the receiving, by the terminal, the PSRS according to the transmission information of the PSRS comprises:

in a case that a receiving position of the first PSRS indicated by the first WUS is reached before the terminal receives a second WUS, receiving, by the terminal, the first PSRS according to indication of the first WUS; or in a case that a receiving position of a second WUS is reached before the terminal receives the first PSRS, receiving, by the terminal, the second WUS, and receiving, by the terminal, a second PSRS according to indication of the second WUS, wherein the second WUS is used for indicating transmission information of the second PSRS.

13. A terminal, comprising: a processor, a memory and a computer program stored in the memory and configured to be executed by the processor, wherein the processor is configured to execute the computer program to cause the terminal to implement the steps of the method according to claim 8.

14. A non-transitory computer storage medium, comprising instructions, wherein the instructions, when being executed by a computer, cause the computer to implement the method according to claim 8.

* * * * *